(12) United States Patent
Uchishiba

(10) Patent No.: US 12,463,279 B2
(45) Date of Patent: Nov. 4, 2025

(54) CASE FOR ELECTRIC APPARATUS AND ELECTRIC APPARATUS DEVICE

(71) Applicant: KYOCERA Corporation, Kyoto (JP)

(72) Inventor: Hirofumi Uchishiba, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 692 days.

(21) Appl. No.: 17/604,760

(22) PCT Filed: Apr. 1, 2020

(86) PCT No.: PCT/JP2020/015103
§ 371 (c)(1),
(2) Date: Oct. 19, 2021

(87) PCT Pub. No.: WO2020/217912
PCT Pub. Date: Oct. 29, 2020

(65) Prior Publication Data
US 2022/0181736 A1  Jun. 9, 2022

(30) Foreign Application Priority Data

Apr. 24, 2019 (JP) ................................. 2019-083326

(51) Int. Cl.
| | | |
|---|---|---|
| *H01M 50/24* | (2021.01) | |
| *H01M 50/202* | (2021.01) | |
| *H01M 50/224* | (2021.01) | |
| *H01M 50/244* | (2021.01) | |
| *H01M 50/264* | (2021.01) | |
| *H01M 50/276* | (2021.01) | |
| *H01M 50/289* | (2021.01) | |
| *H05K 5/06* | (2006.01) | |

(52) U.S. Cl.
CPC ......... *H01M 50/24* (2021.01); *H01M 50/202* (2021.01); *H01M 50/224* (2021.01); *H01M 50/244* (2021.01); *H01M 50/264* (2021.01); *H01M 50/276* (2021.01); *H01M 50/289* (2021.01); *H05K 5/061* (2013.01)

(58) Field of Classification Search
CPC .. H01M 50/24; H01M 50/202; H01M 50/224; H01M 50/244; H01M 50/264; H01M 50/276; H01M 50/289; H05K 5/061; H02B 1/28
See application file for complete search history.

(56) References Cited

U.S. PATENT DOCUMENTS

| | | | |
|---|---|---|---|
| 6,128,861 A | 10/2000 | Calamari et al. | |
| 6,211,466 B1 | 4/2001 | Benner et al. | |
| 2015/0221911 A1* | 8/2015 | Kim ..................... | H01M 50/26 429/159 |

FOREIGN PATENT DOCUMENTS

| | | |
|---|---|---|
| CN | 106028730 B | 1/2019 |
| DE | 8432777.4 U1 | 4/1985 |
| EP | 3076507 A1 | 10/2016 |

(Continued)

*Primary Examiner* — Eugenia Wang
(74) *Attorney, Agent, or Firm* — HAUPTMAN HAM, LLP

(57) ABSTRACT

A case for an electric apparatus that accommodates an electric apparatus and an electric apparatus device, the case comprising a case body including a ring-shaped case seal surface, a cover body including a curved cover portion, a waterproof frame including a ring-shaped cover seal surface and disposed at the cover body, and a seal member disposed between the case seal surface and the cover seal surface.

8 Claims, 10 Drawing Sheets

(56) References Cited

FOREIGN PATENT DOCUMENTS

| | | |
|---|---|---|
| JP | S5765511 U | 4/1982 |
| JP | S5838067 U | 3/1983 |
| JP | 2005261007 A | 9/2005 |
| JP | 201860828 A | 4/2018 |

* cited by examiner

CASE FOR ELECTRIC APPARATUS AND ELECTRIC APPARATUS DEVICE

CROSS REFERENCES TO RELATED APPLICATIONS

The present application is a National Phase of International Application Number PCT/JP2020/015103 filed Apr. 1, 2020, and claims priority to Japanese Patent Application No. 2019-083326, filed on Apr. 24, 2019. The entire disclosure of the earlier application is incorporated herein by reference.

TECHNICAL FIELD

The present disclosure relates to a case for an electric apparatus and an electric apparatus device.

BACKGROUND ART

For example, an electric apparatus device, such as a storage battery device, that accommodates an electric apparatus, such as a storage battery, in a case is becoming widely used, notably, in homes, the storage battery including a storage battery body and a control circuit that controls the operation of the storage battery body. Since such an electric apparatus device is often installed outdoors, the case that accommodates the electric apparatus is required to have high waterproofness.

For example, PTL1 discloses a structure of a case including a body case that has an opening and a front cover that covers the opening of the body case. The structure has its waterproofness increased in the following way. That is, by forming the front cover to have a structure in which, in addition to a front-cover front surface that covers the opening of the body case, a front-cover top surface that covers a top surface of the body case is integrally disposed, an upper side of the case is formed with a double structure in which the front-cover top surface and the top surface of the body case are superimposed upon each other.

CITATION LIST

Patent Literature

PTL 1: Japanese Unexamined Patent Application Publication No. 2018-60828

SUMMARY

A case for an electric apparatus according to an embodiment of the present disclosure is a case for an electric apparatus that accommodates the electric apparatus. The case includes a case body including an opening and a ring-shaped case seal surface that is constituted in a same plane and that surrounds the opening; a cover body including a rectangular flat cover portion and a curved cover portion that is continuous with one side of the flat cover portion, the cover body covering the opening by being mounted on the case body; a waterproof frame including a ring-shaped cover seal surface that is constituted in a same plane and that faces the case seal surface, the waterproof frame being disposed at the cover body and on an inner side of the flat cover portion and the curved cover portion; and a seal member disposed between the case seal surface and the cover seal surface, the seal member sealing a location between the case seal surface and the cover seal surface.

An electric apparatus device according to an embodiment of the present disclosure includes any one of the cases for an electric apparatus according to the present disclosure, and an electric apparatus in the case for the electric apparatus.

DESCRIPTION OF EMBODIMENTS

Hitherto, a case for an electric apparatus device has been required not only to have functionality, such as being waterproof as mentioned above, but also to have higher designability (design properties).

An object of the present disclosure is to provide a case for an electric apparatus and an electric apparatus device, each of whose designability is increased while its functionality is ensured.

According to an embodiment of the present disclosure, it is possible to provide a case for an electric apparatus and an electric apparatus device, each of whose designability is increased while its functionality is ensured.

An embodiment of the present disclosure is exemplified in detail below with reference to the drawings.

Figure 1:
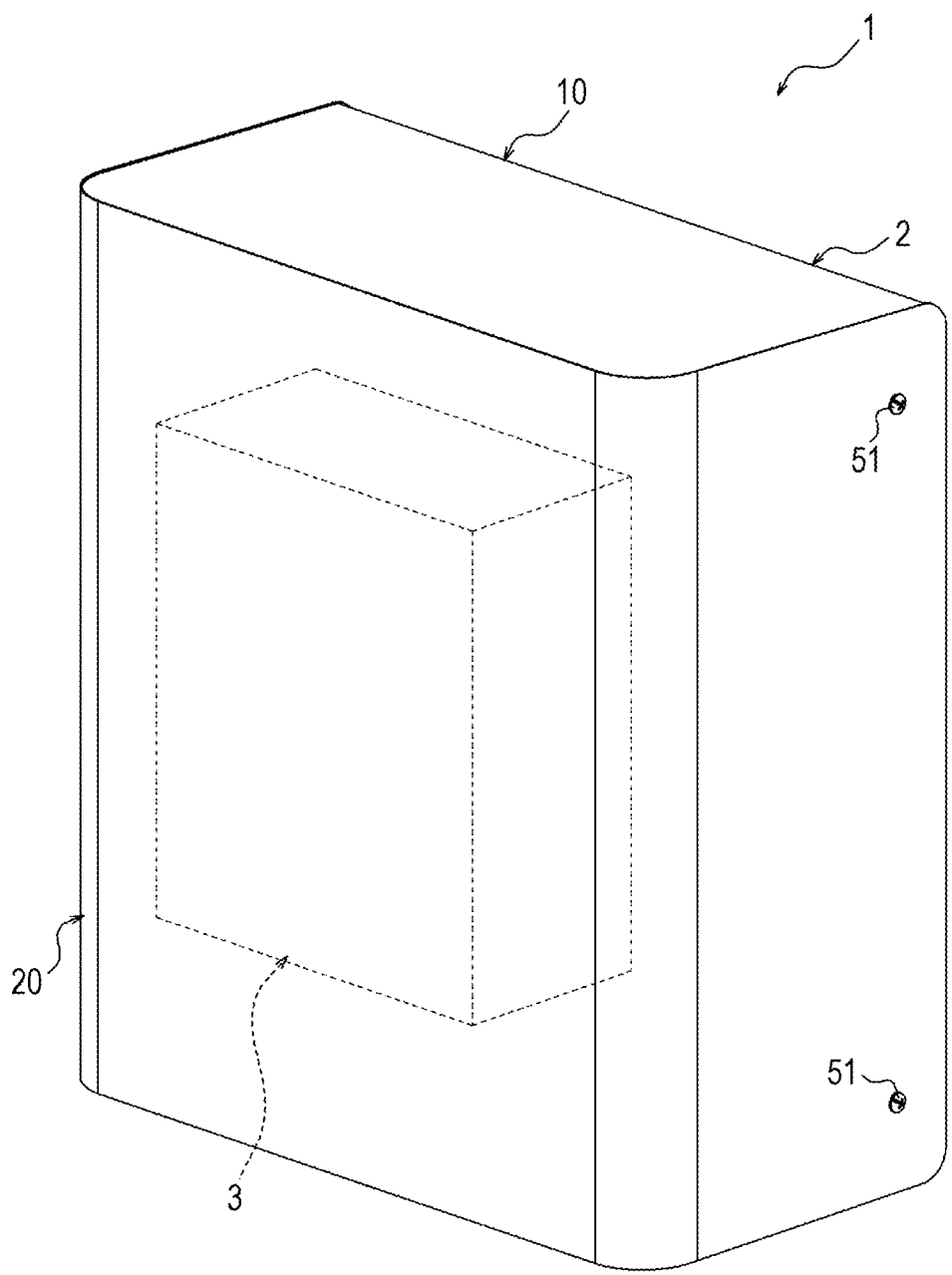
FIG. 1 is a perspective view of an electric apparatus device according to an embodiment of the present disclosure.

As shown in FIG. 1, an electric apparatus device 1 according to the embodiment includes a case 2 for an electric apparatus and an electric apparatus 3 in the case 2 for an electric apparatus.

In the present embodiment, the electric apparatus device 1 is constituted as a home storage battery device. The electric apparatus 3 schematically shown in FIG. 1 is a storage battery. The storage battery includes, for example, a storage battery body and a control circuit that controls the operation of the storage battery body. As the storage battery body mentioned above, for example, a lithium-ion battery or a nickel-metal hydride battery can be used. The electric apparatus device 1 constituted by the storage battery device can be used for, for example, storing electric power produced by, for example, a solar battery by connecting the electric apparatus device 1 to the solar battery, the solar battery being installed on the roof of a house or the like.

The electric apparatus device 1 can be constituted so that the case 2 for an electric apparatus accommodates, in addition to the electric apparatus 3, a plurality of types of electric apparatuses having different functions or structures, such as a power conversion device, a fuel cell, or a ventilation fan. The electric apparatus device 1 can be constituted so that the case 2 for an electric apparatus accommodates, in addition to the electric apparatus 3, for example, a material, such as a heat-insulating material or a cushioning material.

Note that the electric apparatus 3 that is in the case 2 for an electric apparatus is not limited to the storage battery described above and may be, for example, other electric apparatuses having different functions or structures, such as a fuel battery, a power conversion device, a transformation device, or a device having the function of supplying electric power to a commercial power system.

The electric apparatus device 1 can be installed outdoors. In the present embodiment, the electric apparatus device 1 is installed at, for example, an outer wall of houses with a mounting fitting, a stand, or the like.

Note that the place where the electric apparatus device is installed is not limited to inside a building. The electric apparatus device 1 may be installed at other places, such as outside a building.

Figure 2:
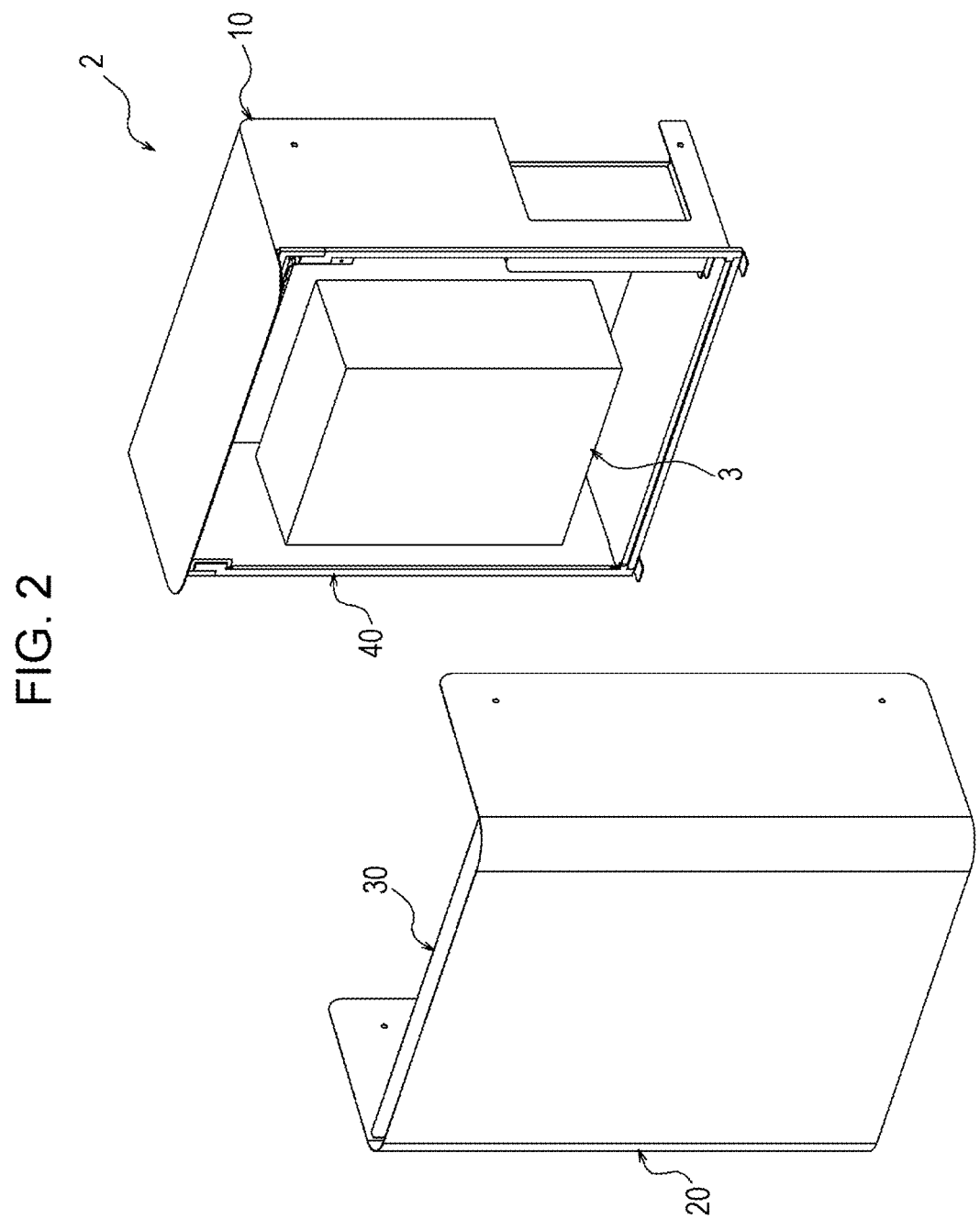
FIG. 2 is a perspective view of the electric apparatus device shown in FIG. 1 with a cover body removed from a case body.

As shown in FIG. 2, the case 2 for an electric apparatus that accommodates the electric apparatus 3 includes a case body 10, a cover body 20, a waterproof frame 30, and a seal member 40.

Figure 3:
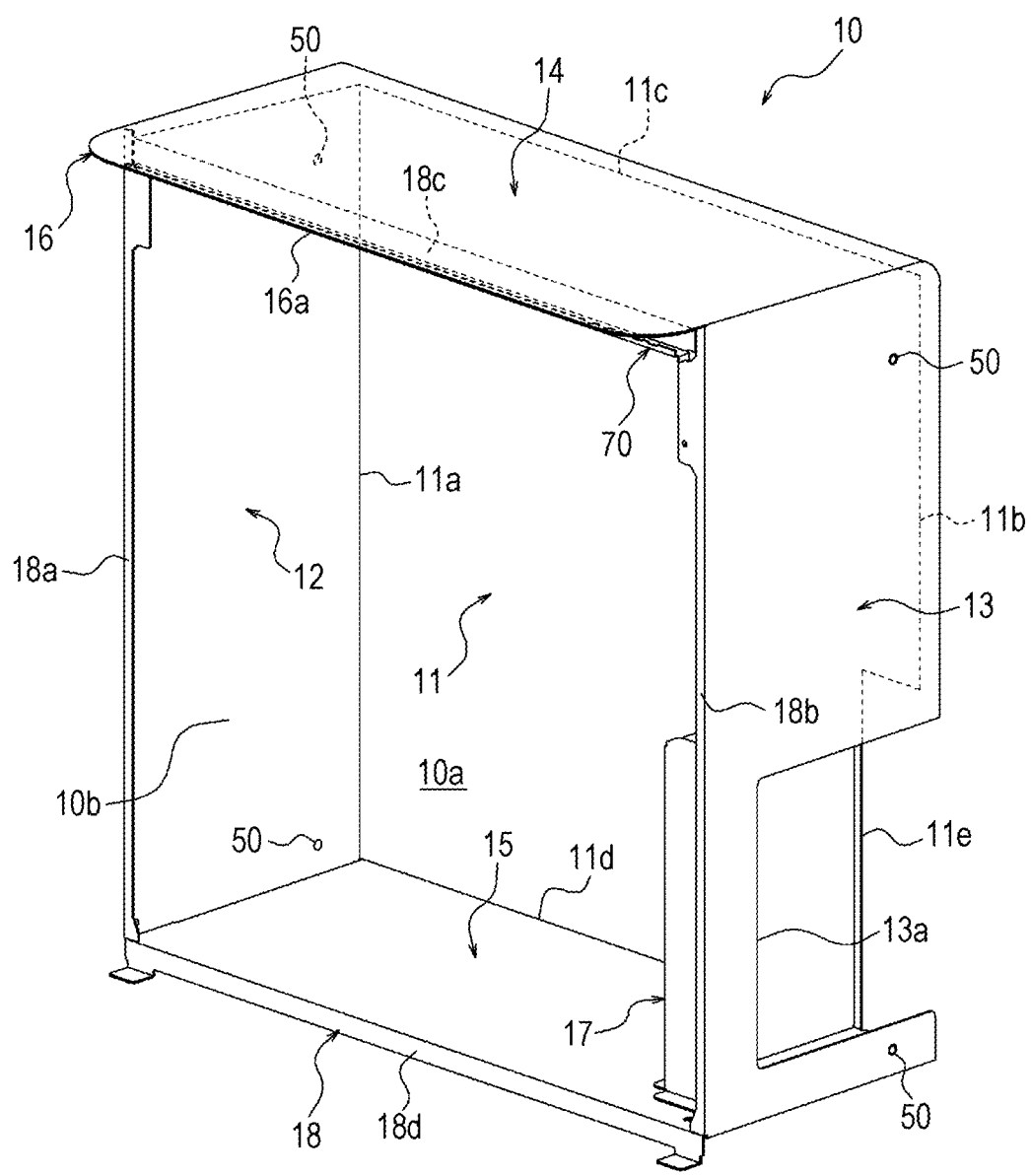
FIG. 3 is a perspective view of the case body shown in FIG. 2.

As shown in FIG. 3, the case body 10 has a box shape including a first wall 11, a second wall 12, a third wall 13, a fourth wall 14, and a fifth wall 15. In the present embodiment, the case body 10 is formed by, for example, processing one metal plate, such as a steel plate, an aluminum-alloy plate, or a stainless-steel plate. Such a structure makes it possible to manufacture at a low cost the case body 10 having the shape above.

The case body 10 is not limited to one formed from the metal plate mentioned above, and may be one manufactured by using other materials or manufacturing methods, for example, a metal casting, such as an aluminum alloy casting or a part made by injection molding of a synthetic resin material. The case body 10 may be constituted by integrally connecting the first wall 11, the second wall 12, the third wall 13, the fourth wall 14, and the fifth wall 15, which are formed as separated walls, by, for example, welding, bonding, or fastening them.

The first wall 11 has a first side 11a and a second side 11b that are parallel to each other, and a third side 11c and a fourth side 11d that are orthogonal to the first side 11a and the second side 11b and that are parallel to each other. The first wall 11 has a cut portion 11e having a rectangular shape recessed toward the first side 11a along the fourth side 11d from the second side 11b. Thus, the first wall 11 has an outer shape that is a substantially rectangular plate shape, with the outer shape having the four sides 11a to 11d and having the cut portion 11e in a portion thereof. In the present embodiment, the first wall 11 constitutes a rear surface of the case body 10.

The second wall 12 has a rectangular plate shape that is more elongated than the shape of the first wall 11, and is continuous with the first side 11a of the first wall 11 at right angles to the first side 11a.

The third wall 13 has an elongated rectangular plate shape that is similar to the shape of the second wall 12, and is continuous with the second side 11b of the first wall 11 at right angles to the second side 11b and faces the second wall 12. The third wall 13 has a rectangular cut portion 13a that is recessed from the second side 11b in a direction away from the first wall 11.

In the present embodiment, the second wall 12 and the third wall 13 constitute side surfaces that face each other in a parallel state and that each face sideways with respect to the case body 10.

The fourth wall 14 has a plate shape that is more elongated than the shape of the first wall 11, and is continuous with the third side 11c of the first wall 11 at right angles to the third side 11c and with upper sides, which are upper sides in FIG. 3, of the respective second wall 12 and third wall 13 at right angles to the upper sides. In the present embodiment, the fourth wall 14 constitutes a top surface of the case body 10 that faces upward.

A protruding wall 16 that protrudes with respect to the second wall 12 and the third wall 13 in a direction away from the first wall 11 is integrally disposed with the fourth wall 14. The protruding wall 16 has an end surface 16a that is parallel to a surface of the first wall 11 and whose both side end surfaces are curved with a predetermined curvature.

The fifth wall 15 has an elongated plate shape that is similar to the shape of the fourth wall 14. The fifth wall 15 is continuous with the fourth side 11d of the first wall 11 at right angles to the fourth side 11d and with lower sides, which are lower sides in FIG. 3, of the respective second wall 12 and third wall 13 at right angles to the lower sides; and faces the fourth wall 14. In the present embodiment, the fifth wall 15 constitutes a bottom surface of the case body 10 that faces downward.

Note that the cut portion 11e and the cut portion 13a of the case body 10 are closed from an inner side of the case body 10 by a cover wall 17.

The inside of the case body 10 is an accommodation space 10a that accommodates the electric apparatus 3. A side of the case body 10 opposite to the first wall 11 is an opening 10b. By removing the cover body 20 from the case body 10 and causing the opening 10b to communicate with the outside, it is possible to dispose the electric apparatus 3 in the accommodation space 10a through the opening 10b.

The case body 10 has a ring-shaped case seal surface 18 that is constituted in the same plane parallel to the first wall 11, and that surrounds the opening 10b.

More specifically, the case seal surface 18 has a first case seal surface 18a, a second case seal surface 18b, a third case seal surface 18c, and a fourth case seal surface 18d. The first case seal surface 18a is constituted as an outwardly facing surface of a flange-like portion formed by inwardly bending at right angles a side portion of the second wall 12 on a side of the opening 10b, the outwardly facing surface being parallel to the first wall 11. The second case seal surface 18b is constituted as an outwardly facing surface of a flange-like portion formed by inwardly bending at right angles a side portion of the third wall 13 on a side of the opening 10b, the outwardly facing surface being parallel to the first wall 11. The third case seal surface 18c is constituted as an outwardly facing surface of a frame material 19 fixed to a lower surface of the protruding wall 16 facing the fifth wall 15, the outwardly facing surface being parallel to the first wall 11. The fourth case seal surface 18d is constituted as an outwardly facing surface of a flange-like portion formed by outwardly bending at right angles a side portion of the fifth wall 15 on a side of the opening 10b, the outwardly facing surface being parallel to the first wall 11. One end of the third case seal surface 18c is continuous with one end of the first case seal surface 18a, one end of the second case seal surface 18b is continuous with the other end of the third case seal surface 18c, one end of the fourth case seal surface 18d is continuous with the other end of the second case seal surface 18b, and the other end of the first case seal surface 18a is continuous with the other end of the fourth case seal surface 18d. In this way, the case body 10 has the ring-shaped case seal surface 18 surrounding the opening 10b as a result of the first case seal surface 18a, the second case seal surface 18b, the third case seal surface 18c, and the fourth case seal surface 18d being continuous with each other in the form of a ring.

Figure 4:
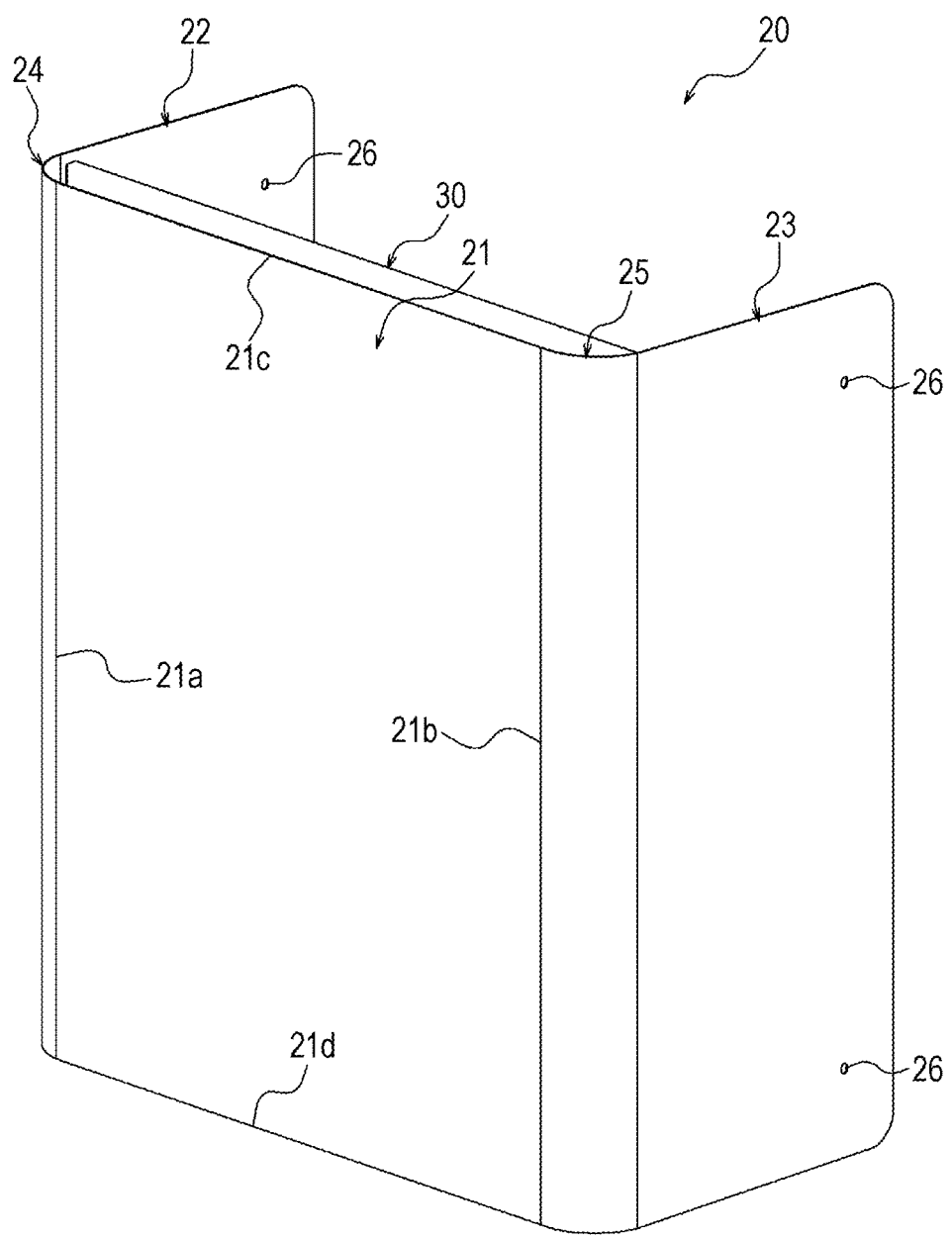
FIG. 4 is a perspective view of the cover body shown in FIG. 2.

As shown in FIG. 4, the cover body 20, which is an external panel, has a U shape (C shape) in cross section including a flat cover portion 21, a first side cover portion 22 that covers the second wall 12 from an outer side thereof, a second side cover portion 23 that covers the third wall 13 from an outer side thereof, a first curved cover portion 24 that is continuous with the flat cover portion 21 and the first side cover portion 22, and a second curved cover portion 25 that is continuous with the flat cover portion 21 and the second side cover portion 23. The plate thickness of the cover body 20 can be set to any value, and may be, for example, 0.3 mm to 3.5 mm.

The cover body 20 can be formed by, for example, bending one metal plate, such as a steel plate, an aluminum-alloy plate, or a stainless-steel plate. Such a structure makes it possible to easily manufacture at a low cost the cover body 20 having the shape above by simple bending.

The cover body 20 is not limited to one in which the flat cover portion 21, the first side cover portion 22, the second side cover portion 23, the first curved cover portion 24, and the second curved cover portion 25 are integrally formed with each other by bending one metal plate. The cover body 20 can be constituted by integrally connecting the flat cover portion 21, the first side cover portion 22, the second side cover portion 23, the first curved cover portion 24, and the second curved cover portion 25, which are formed as separate members, by, for example, welding, bonding, or fastening them. The cover body 20 is not limited to one formed of a metal, and may be one formed of other materials, such as a part made by injection molding of a synthetic resin material.

The flat cover portion 21 has a first side 21a and a second side 21b that are parallel to the first side 11a of the first wall 11 of the case body 10. The flat cover portion 21 has a third side 21c and a fourth side 21d that are parallel to the third side 11c of the first wall 11. In this way, the flat cover portion 21 has an outer shape that is a rectangular plate shape, the outer shape having the four sides 21a to 21d.

The first curved cover portion 24 is integrated and continuous with the first side 21a of the flat cover portion 21. The first curved cover portion 24 is bent toward the first wall 11 from the first side 21a to have an arc shape having a central angle of 90 degrees with an axis parallel to the first side 21a being a central axis.

The second curved cover portion 25 is integrated and continuous with the second side 21b of the flat cover portion 21. The second curved cover portion 25 is bent toward the first wall 11 from the second side 21b to have an arc shape having a central angle of 90 degrees with an axis parallel to the second side 21b being a central axis.

The radius of the first curved cover portion 24 that is curved in an arc shape and the radius of the second curved cover portion 25 that is curved in an arc shape are substantially equal to the curvatures of the two curved side end surfaces of the protruding wall 16.

The first side cover portion 22 has a rectangular plate shape that is parallel to the second wall 12, and is integrated and continuous with the first curved cover portion 24.

The second side cover portion 23 has a rectangular plate shape that is parallel to the third wall 13, and is integrated and continuous with the second curved cover portion 25.

The first side cover portion 22 and the second side cover portion 23 each have two mount holes 26 (with regard to the first side cover portion 22, only one of the mount holes 26 is shown). On the other hand, as shown in FIG. 3, two threaded holes 50 are disposed at a first-wall-11 side of the second wall 12 of the case body 10 and two threaded holes 50 are disposed at a first-wall-11 side of the third wall 13 of the case body 10, with one of the two threaded holes 50 being disposed toward the fourth wall 14 and the other of the two threaded holes 50 being disposed toward the fifth wall 15.

As shown in FIG. 1, the cover body 20 is mounted on the case body 10 by screwing threaded members 51 inserted into the mount holes 26 of the cover body 20 into the corresponding threaded holes 50 of the case body 10. The cover body 20 mounted on the case body 10 covers the opening 10b of the case body 10. Note that, as the threaded members 51, rod-tip screws having at their tips rod-like portions whose diameter is smaller than the diameter of the roots of screw threads can be used.

Figure 5:
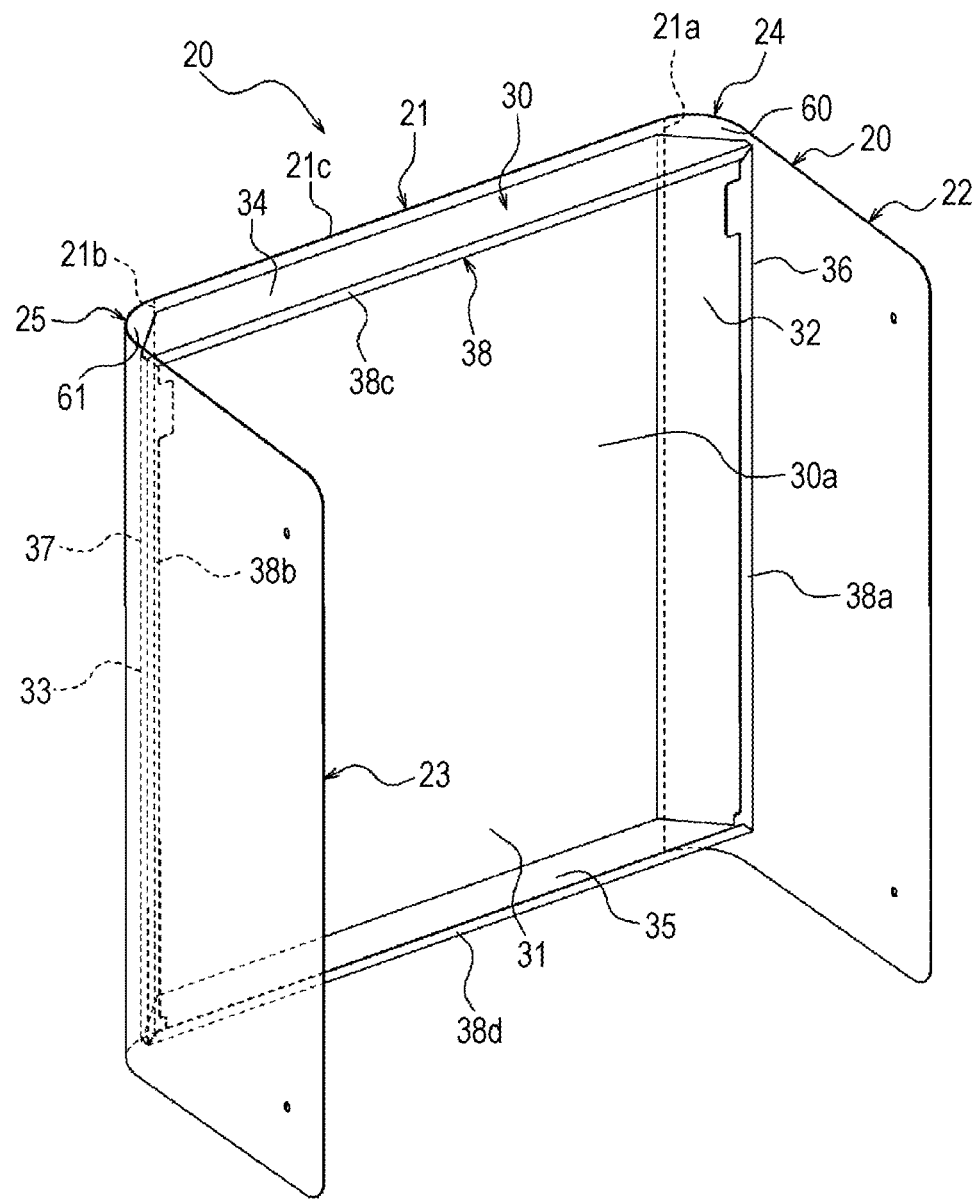
FIG. 5 is a perspective view showing a waterproof frame mounted on the cover body.
Figure 6:
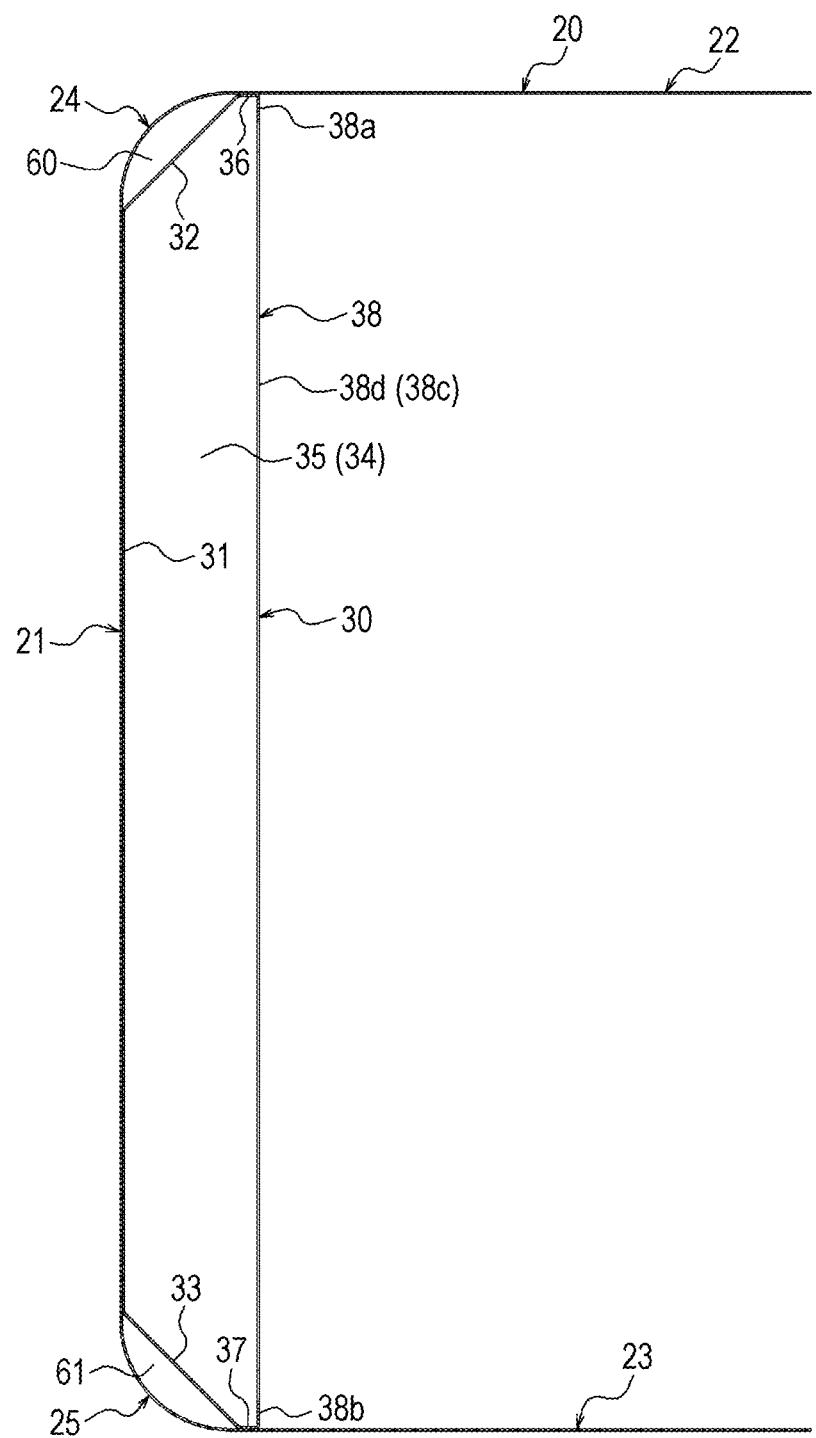
FIG. 6 is a cross-sectional view of the cover body shown in FIG. 4.

As shown in FIGS. 5 and 6, the waterproof frame 30 is disposed at the cover body 20 and on an inner side of the flat cover portion 21 and the pair of curved cover portions (the first curved cover portion 24 and the second curved cover portion 25).

More specifically, the waterproof frame 30 has a box shape including a fixing wall portion 31, a first partition wall portion 32, a second partition wall portion 33, a third partition wall portion 34, and a fourth partition wall portion 35, with a portion of the waterproof frame 30 facing the fixing wall portion 31 being an opening 30a. The fixing wall portion 31 has a rectangular plate shape having a size that is the same as or smaller than the size of the flat cover portion 21. The first partition wall portion 32 is continuous with a side portion of the fixing wall portion 31 on a side of the first curved cover portion 24. The second partition wall portion 33 is continuous with a side portion of the fixing wall portion 31 on a side of the second curved cover portion 25. The third partition wall portion 34 is continuous with a side portion of the fixing wall portion 31 on a side of the third side 21c and with the first partition wall portion 32 and the second partition wall portion 33. The fourth partition wall portion 35 is continuous with a side portion of the fixing wall portion on a side of the fourth side 21d and with the first partition wall portion 32 and the second partition wall portion 33. In a state in which the cover body 20 is mounted on the case body 10, the opening 30a of the waterproof frame 30 is continuous with the opening 10b of the case body 10, and an internal space of the waterproof frame 30 communicates with the accommodation space 10a of the case body 10, and, together with the accommodation space 10a, constitutes an internal space of the case 2 for an electric apparatus.

The waterproof frame 30 is integrated with the cover body 20 by fixing the fixing wall portion 31 to the flat cover portion 21 by, for example, a method such as spot welding or bonding. Portions of the waterproof frame 30 other than the opening 30a are hermetically sealed air-tightly or fluid-tightly.

Note that the waterproof frame 30 can be constituted without including the fixing wall portion 31 by directly fixing the first partition wall portion 32, the second partition wall portion 33, the third partition wall portion 34, and the fourth partition wall portion 35 to the flat cover portion 21 by a method such as welding. In this case, an open end on a side opposite to an opening 30a of a ring-shaped frame body portion that is constituted by the first partition wall portion 32, the second partition wall portion 33, the third partition wall portion 34, and the fourth partition wall portion is hermetically sealed air-tightly or fluid-tightly by the flat cover portion 21.

Each portion of the waterproof frame 30 is more specifically described. The first partition wall portion 32 has an elongated flat plate shape extending parallel to the first side 21a of the flat cover portion 21, and extends in a tilted manner toward the first curved cover portion 24 in a direction perpendicular to the flat cover portion 21 from the flat cover portion 21 toward the case seal surface 18 (in a direction away from the flat cover portion 21). A side portion of the first partition wall portion 32 opposite to a side portion thereof that is disposed consecutively with the flat cover portion 21 abuts upon the first side cover portion 22, and a first support wall 36 that is integrated and continuous with the side portion is fixed to the first side cover portion 22 by a method, such as spot welding or bonding. A first communication portion 60 that is constituted as a space that extends in a direction along the first side 21a of the flat cover portion 21 and opens toward the third partition wall portion 34 and the fourth partition wall portion 35 is disposed between the first partition wall portion 32 and the first curved cover portion 24.

Similarly, the second partition wall portion 33 has an elongated flat plate shape extending parallel to the second side 21b of the flat cover portion 21, and extends in a tilted manner toward the second curved cover portion 25 in a direction perpendicular to the flat cover portion 21 from the flat cover portion 21 toward the case seal surface 18 (in a direction away from the flat cover portion 21). A side portion of the second partition wall portion 33 opposite to a side portion thereof that is disposed consecutively with the flat cover portion 21 abuts upon the second side cover portion 23, and a second support wall 37 that is integrated and continuous with the side portion is fixed to the second side cover portion 23 by a method, such as spot welding or bonding. A second communication portion 61 that is constituted as a space that extends in a direction along the second side 21b of the flat cover portion 21 and opens toward the third partition wall portion 34 and the fourth partition wall portion 35 is disposed between the second partition wall portion 33 and the second curved cover portion 25.

The third partition wall portion 34 has an elongated flat trapezoidal shape extending parallel to the third side 21c of the flat cover portion 21, and extends in a tilted manner in a direction away from the fourth partition wall portion 35 toward the case seal surface 18 from the flat cover portion 21 (in a direction away from the flat cover portion 21). Two side portions of the third partition wall portion 34 are continuous with a corresponding one of the first partition wall portion 32 and the second partition wall portion 33.

The fourth partition wall portion 35 has an elongated flat trapezoidal shape extending parallel to the fourth side 21d of the flat cover portion 21, and extends perpendicularly to the fixing wall portion 31 toward the case seal surface 18 from the flat cover portion 21 (in a direction away from the flat cover portion 21). Two side portions of the fourth partition wall portion 35 are continuous with a corresponding one of the first partition wall portion 32 and the second partition wall portion 33.

Figure 7:
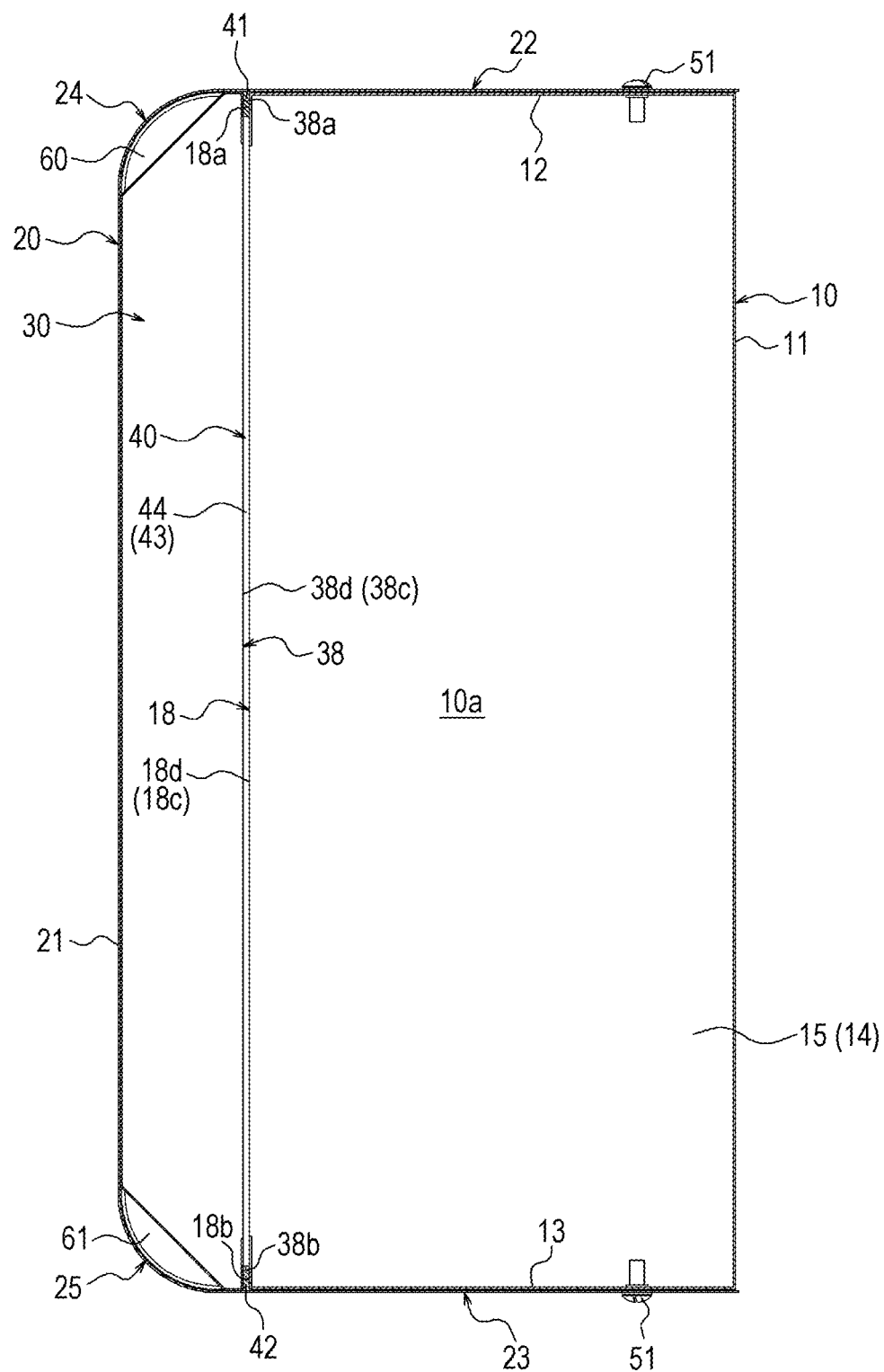
FIG. 7 is a cross-sectional view of the electric apparatus device shown in FIG. 1.
Figure 8:
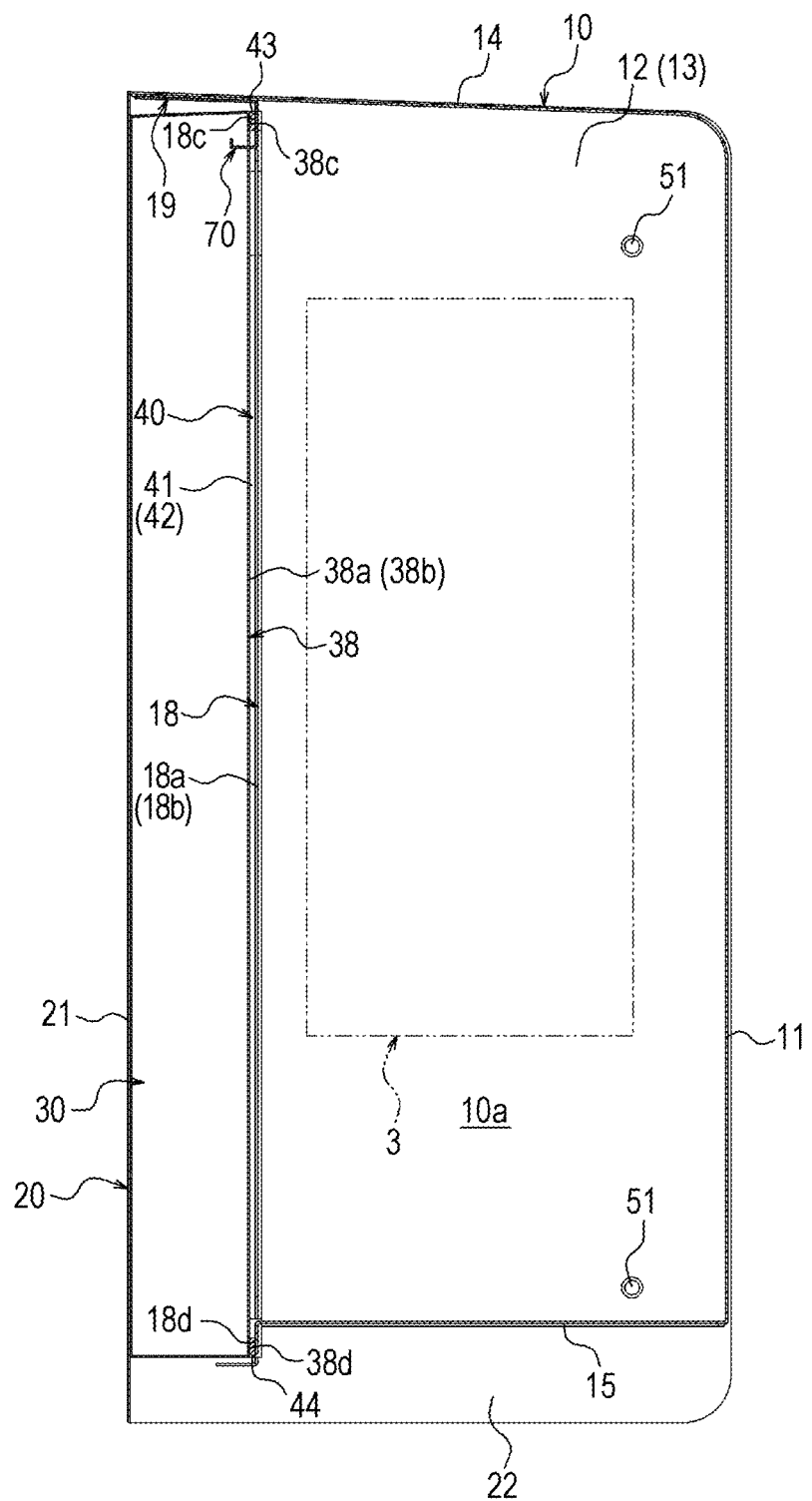
FIG. 8 is a longitudinal sectional view of the electric apparatus device shown in FIG. 1.

The waterproof frame 30 has a ring-shaped cover seal surface 38 that is constituted in the same plane parallel to the flat cover portion 21 and that surrounds the opening 30a. As shown in FIGS. 7 and 8, in the state in which the cover body 20 is mounted on the case body 10, the cover seal surface 38 faces the case seal surface 18. Here, the cover seal surface 38 and the case seal surface 18 are parallel to each other.

More specifically, the cover seal surface 38 has a first cover seal surface 38a, a second cover seal surface 38b, a third cover seal surface 38c, and a fourth cover seal surface 38d. The first cover seal surface 38a is constituted as an outwardly facing surface of a flange-like portion formed by inwardly bending a side portion of the first support wall 36, the outwardly facing surface being parallel to the flat cover portion 21. The second cover seal surface 38b is constituted as an outwardly facing surface of a flange-like portion formed by inwardly bending a side portion of the second support wall 37, the outwardly facing surface being parallel to the flat cover portion 21. The third cover seal surface 38c is constituted as an outwardly facing surface of a flange-like portion formed by inwardly bending a side portion of the third partition wall portion 34 on a side of the opening 30a, the outwardly facing surface being parallel to the flat cover portion 21. The fourth cover seal surface 38d is constituted as an outwardly facing surface of a flange-like portion formed by inwardly bending a side portion of the fourth partition wall portion 35 on the side of the opening 30a, the outwardly facing surface being parallel to the flat cover portion 21. One end of the third cover seal surface 38c is continuous with one end of the first cover seal surface 38a, one end of the second cover seal surface 38b is continuous with the other end of the third cover seal surface 38c, one end of the fourth cover seal surface 38d is continuous with the other end of the second cover seal surface 38b, and the other end of the first cover seal surface 38a is continuous with the other end of the fourth cover seal surface 38d. In this way, the waterproof frame 30 has the ring-shaped cover seal surface 38 that surrounds the opening 30a as a result of the first cover seal surface 38a, the second cover seal surface 38b, the third cover seal surface 38c, and the fourth cover seal surface 38d being continuous with each other in the form of a ring, and that faces the case seal surface 18.

In the present embodiment, the cover seal surface 38 is disposed further away than the pair of curved cover portions (the first curved cover portion 24 and the second curved cover portion 25) from the flat cover portion 21. That is, the cover seal surface 38 is, in a direction perpendicular to the flat cover portion 21, disposed further away than a side portion of the first curved cover portion 24 that is continuous with the first side cover portion 22 and a side portion of the second curved cover portion 25 that is continuous with the second side cover portion 23 from the flat cover portion 21. Therefore, the first cover seal surface 38a is disposed adjacent to the first side cover portion 22, and the second cover seal surface 38b is disposed adjacent to the second side cover portion 23.

The waterproof frame 30 having the structure above can be formed by, for example, processing one metal plate, such as a steel plate, an aluminum-alloy plate, or a stainless-steel plate. Such a structure makes it possible to manufacture at a low cost the waterproof frame 30 having the shape above.

Figure 9:
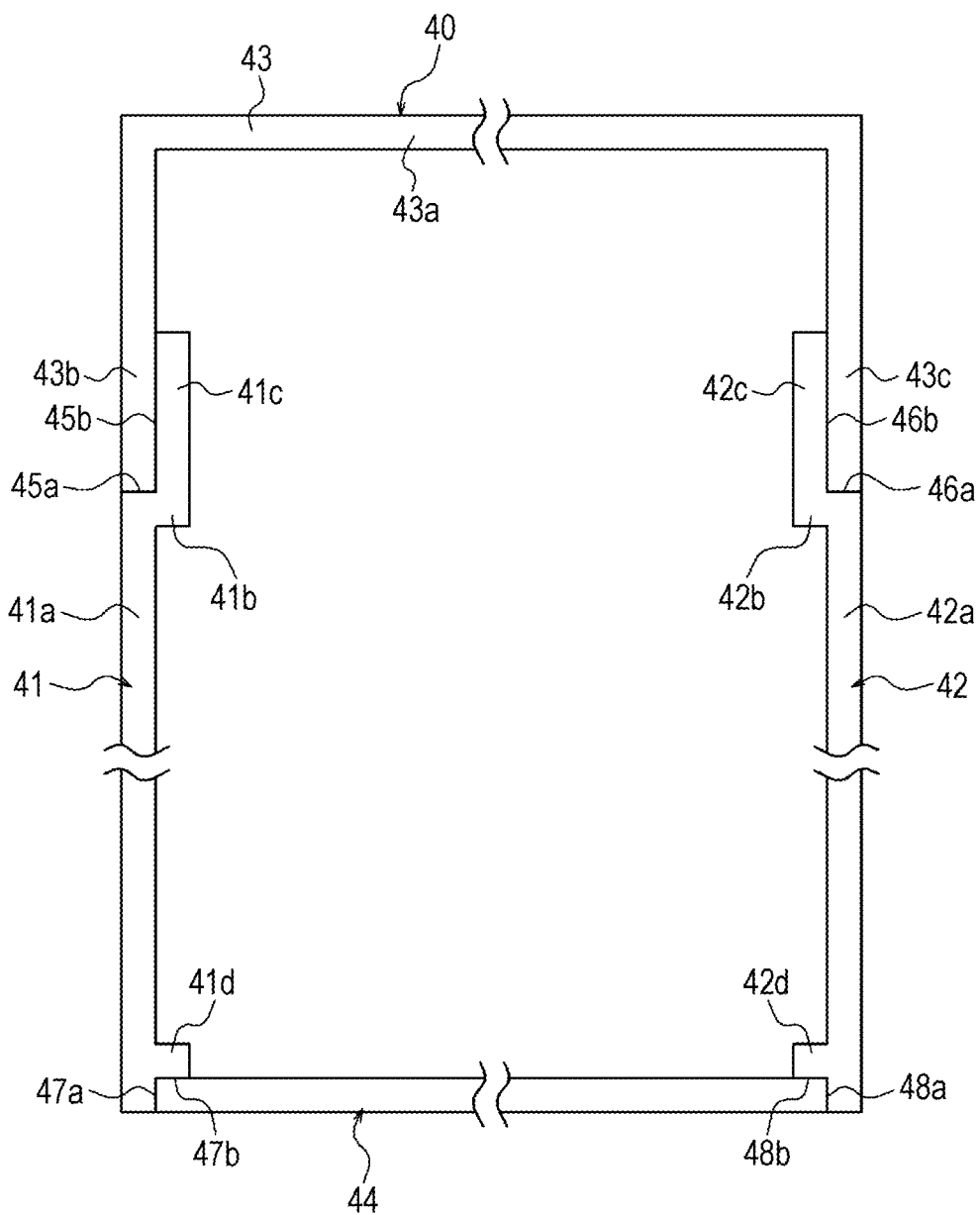
FIG. 9 is an explanatory view schematically showing a structure of a seal member.

As shown in FIG. 9, the seal member 40 is constituted in the form of a ring that is in correspondence with the shape of the case seal surface 18 and the shape of the cover seal surface 38. As shown in FIGS. 7 and 8, in the state in which the cover body 20 is mounted on the case body 10, the seal member 40 being elastically deformed by a predetermined proportion in a compression direction is disposed between the case seal surface 18 and the cover seal surface 38. The seal member 40 is in contact with the ring-shaped case seal surface 18 and the ring-shaped cover seal surface 38 over the entire peripheries thereof, and seals a location between the case seal surface 18 and the cover seal surface 38 by a degree that does not allow entry of water, such as rainwater. That is, the seal member 40 is constituted to have a waterproof function that seals a location between the case seal surface 18 and the cover seal surface 38 by being disposed between the case seal surface 18 and the cover seal surface 38.

In this way, by disposing the seal member 40 between the case seal surface 18 of the case body 10 and the cover seal surface 38 of the waterproof frame 30, disposed at the cover body 20, it is possible to prevent water, such as rainwater, from entering the accommodation space 10a in the case body 10 from a location between the case body 10 and the cover body 20 or the waterproof frame 30.

The seal member 40 can be made of, for example, an elastic material, such synthetic rubber or elastomer. The seal member 40 may be formed of rubber sponge, which is an ethylene-propylene rubber foam material. Note that the seal member 40 can have a structure or can be made of a material other than those described above.

As shown in FIG. 9, in the present embodiment, the seal member 40 is constituted to have the shape of one ring by combining four members, that is, a first seal portion 41, a second seal portion 42, a third seal portion 43, and a fourth seal portion 44.

The first seal portion 41 is primarily disposed between the first case seal surface 18a and the first cover seal surface 38a opposite thereto, and includes a body portion 41a that extends along the first case seal surface 18a and the first cover seal surface 38a and an auxiliary body portion 41c that is disposed consecutively with one end of the body portion 41a through a stepped portion 41b. The auxiliary body portion 41c is displaced toward an inner side of the case body 10 by an amount corresponding to the width of the body portion 41a from the body portion 41a. On the other end of the body portion 41a, the first seal portion 41 has a protruding portion 41d that protrudes inward from a side portion of the body portion 41a. The protruding portion 41d is displaced by an amount corresponding to the width of the fourth seal portion 44 from the other end of the body portion 41a.

The second seal portion 42 has a shape that is symmetrical to the first seal portion 41. The second seal portion 42 is primarily disposed between the second case seal surface 18b and the second cover seal surface 38b opposite thereto, and includes a body portion 42a that extends along the second case seal surface 18b and the second cover seal surface 38b and an auxiliary body portion 42c that is disposed consecutively with one end of the body portion 42a through a stepped portion 42b. The auxiliary body portion 42c is displaced toward an inner side of the case body 10 by an amount corresponding to the width of the body portion 42a from the body portion 42a. On the other end of the body portion 42a, the second seal portion 42 has a protruding portion 42d that protrudes inward from a side portion of the body portion 42a. The protruding portion 42d is displaced by an amount corresponding to the width of the fourth seal portion 44 from the other end of the body portion 42a.

The third seal portion 43 includes a body portion 43a, a first auxiliary body portion 43b, and a second auxiliary body portion 43c. The body portion 43a is disposed between the third case seal surface 18c and the third cover seal surface 38c opposite thereto. The first auxiliary body portion 43b is continuous with one end of the body portion 43a, extends in a direction perpendicular to the body portion 43a, and is disposed between the first case seal surface 18a and the first cover seal surface 38a. The second auxiliary body portion 43c is continuous with the other end of the body portion 43a, extends in a direction perpendicular to the body portion 43a, and is disposed between the second case seal surface 18b and the second cover seal surface 38b.

A tip of the first auxiliary body portion 43b that faces in a direction opposite to the body portion 43a abuts upon the one end of the body portion 41a of the first seal portion 41 at which the stepped portion 41b is disposed, and a side portion of the first auxiliary body portion 43b abuts upon a side portion of the auxiliary body portion 41c of the first seal portion 41. A boundary 45a between the tip of the first auxiliary body portion 43b of the third seal portion 43 and the one end of the body portion 41a of the first seal portion 41 extends in a direction parallel to the fourth wall 14 that constitutes the top wall of the case body 10, and a boundary 45b between the side portion of the first auxiliary body portion 43b and the side portion of the auxiliary body portion 41c of the first seal portion 41 extends toward the fourth wall 14 from the boundary 45a and perpendicularly to the boundary 45a.

Similarly, a tip of the second auxiliary body portion 43c that faces in a direction opposite to the body portion 43a abuts upon one end of the body portion 42a of the second seal portion 42 at which the stepped portion 42b is disposed, and a side portion of the second auxiliary body portion 43c abuts upon a side portion of the auxiliary body portion 42c of the second seal portion 42. A boundary 46a between the tip of the first auxiliary body portion 43c of the third seal portion 43 and the one end of the body portion 42a of the second seal portion 42 extends in a direction parallel to the fourth wall 14 that constitutes the top wall of the case body 10, and a boundary 46b between the side portion of the second auxiliary body portion 43c and the side portion of the auxiliary body portion 42c of the second seal portion 42 extends toward the fourth wall 14 from the boundary 46a and perpendicularly to the boundary 46a.

The fourth seal portion 44 is disposed between the fourth case seal surface 18d and the fourth cover seal surface 38d opposite thereto. One end of the fourth seal portion 44 abuts upon the body portion 41a of the first seal portion 41 from a side of the body portion 41a, and a side portion of the fourth seal portion 44 on a side of the one end abuts upon the protruding portion 41d of the first seal portion 41. A boundary 47a between a tip of the fourth seal portion 44 and the body portion 41a of the first seal portion 41 extends toward the fourth wall 14 that constitutes the top wall of the case body 10, and a boundary 47b between the fourth seal portion 44 and the protruding portion 41d of the first seal portion 41 extends perpendicularly to the boundary 47a. Similarly, a boundary 48a between the other end of the fourth seal portion 44 and the body portion 42a of the second seal portion 42 extends toward the fourth wall 14 that constitutes the top wall of the case body 10, and a boundary 48b between the fourth seal portion 44 and the protruding portion 42d of the second seal portion 42 extends perpendicularly to the boundary 48a.

In this way, by constituting the seal member 40 to have one ring shape by combining four members, that is, the first seal portion 41, the second seal portion 42, the third seal portion 43, and the fourth seal portion 44, when the seal member 40 is to be manufactured by being punched out from a rectangular sheet material, the first seal portion 41, the second seal portion 42, the third seal portion 43, and the fourth seal portion 44 can be punched out from one sheet material with a good yield than when a ring-shaped seal member is to be punched out from one sheet material.

Therefore, a plurality of seal members 40 can be manufactured from one sheet material, and thus manufacturing costs of the seal member 40 can be reduced.

In the case 2 for an electric apparatus in a state sealed by the seal member 40, the pressure of air in the accommodation space 10a changes due to, for example, heat produced by the electric apparatus 3 or a change in the temperature of the environment in which the electric apparatus device 1 is installed. Therefore, when the ring-shaped seal member 40 has a structure in which the seal member 40 is divided into a plurality of portions and the portions are joined to each other, air enters and leaves the boundaries of the corresponding joined portions as the pressure of the air in the accommodation space 10a changes. Here, when water adheres to outer surfaces of the joined portions of the seal member 40, this water, together with the air, may be sucked into the accommodation space 10a of the case body 10 through the boundaries of the corresponding joined portions, and the waterproofness of the electric apparatus device 1 or the case 2 for an electric apparatus may be reduced.

With regard to such a problem, in the present embodiment, while the seal member 40 is constituted to have one ring shape by combining four members, that is, the first seal portion 41, the second seal portion 42, the third seal portion 43, and the fourth seal portion 44, these joined portions are constituted to have a corresponding one of the boundaries 45b, 46b, 47a, and 48a, which extend toward the fourth wall 14, or to have a corresponding one of the boundaries 45a, 46a, 47b, and 48b, which extend perpendicularly to the respective boundaries 45b, 46b, 47a, and 48a. Therefore, even if, together with the air, the water adhering to the outer surfaces of the joined portions of the seal member 40 is sucked into the accommodation space 10a of the case body 10 through the boundaries of the joined portions, it is possible to suppress the water from being sucked into the accommodation space 10a of the case body 10 by causing the water to drop due to its own weight at the boundaries 45b, 46b, 47a, and 48a extending toward the fourth wall 14. Consequently, it is possible to increase the waterproofness of the electric apparatus device 1 or the case 2 for an electric apparatus.

Note that the seal member 40 can have, instead of a divided structure, a structure that is formed to have a ring shape by a member having an integrated structure.

In the electric apparatus device 1 or the case 2 for an electric apparatus of the present embodiment having the structures above, the cover body 20 includes the first curved cover portion 24 and the second curved cover portion 25. Therefore, with the cover body 20 having a good external appearance in which the corner portions are rounded, compared with when the first curved cover portion 24 and the second curved cover portion 25 are not disposed at the cover body 20, the case 2 for an electric apparatus and the electric apparatus device 1 of the present embodiment that include the cover body having the shape above can have higher designability (design properties).

In the electric apparatus device 1 or the case 2 for an electric apparatus of the present embodiment, the first curved cover portion 24 and the second curved cover portion 25 that are curved in an arc shape may have a radius that is, for example, greater than or equal to 10 mm. Due to such a structure, the shape formed by rounding the corner portions by disposing the first curved cover portion 24 and the second curved cover portion 25 can sufficiently attract the notice of a person who looks at the shape. Therefore, the cover body 20, and the electric apparatus device 1 or the case 2 for an electric apparatus that use the cover body 20 can have higher designability (design properties).

The first curved cover portion 24 and the second curved cover portion 25 that are curved in an arc shape may have a radius in the range of, for example, 20 to 80 mm. Due to such a structure, the shape formed by rounding the corner portions by disposing the first curved cover portion 24 and the second curved cover portion 25 can moderately attract the notice of a person who looks at the shape. Therefore, the cover body 20 and the electric apparatus device 1 or the case 2 for an electric apparatus that use the cover body 20 can higher designability (design properties).

In the present embodiment, the cover body 20 has a U shape in cross section including the flat cover portion 21, the first side cover portion 22, the second side cover portion 23, the first curved cover portion 24, and the second curved cover portion 25. Therefore, the cover body 20 can have a better external appearance in which both corner portions with the flat cover portion 21 inbetween are rounded. Consequently, compared with when curved cover portions are not disposed at the cover body, the cover body 20 having the shape above and the electric apparatus device 1 or the case 2 for an electric apparatus that use the cover body 20 can have higher designability (design properties).

In the present embodiment, since the second wall 12 and the third wall 13 of the case body 10 are covered by the first side cover portion 22 and the second side cover portion 23, respectively, it is possible to prevent a person from directly touching with his/her hand the second wall 12 and the third wall 13 of the case body 10 heated by heat produced by the electric apparatus 3.

Figure 10A:
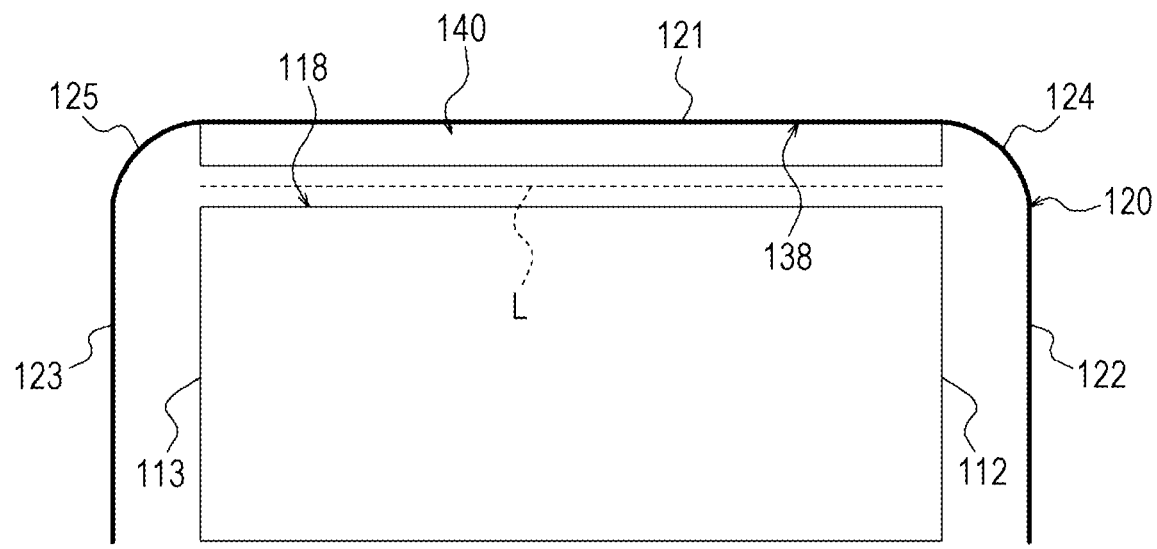
FIG. 10A schematically shows a cross section of an electric apparatus device of a comparative example.
Figure 10B:
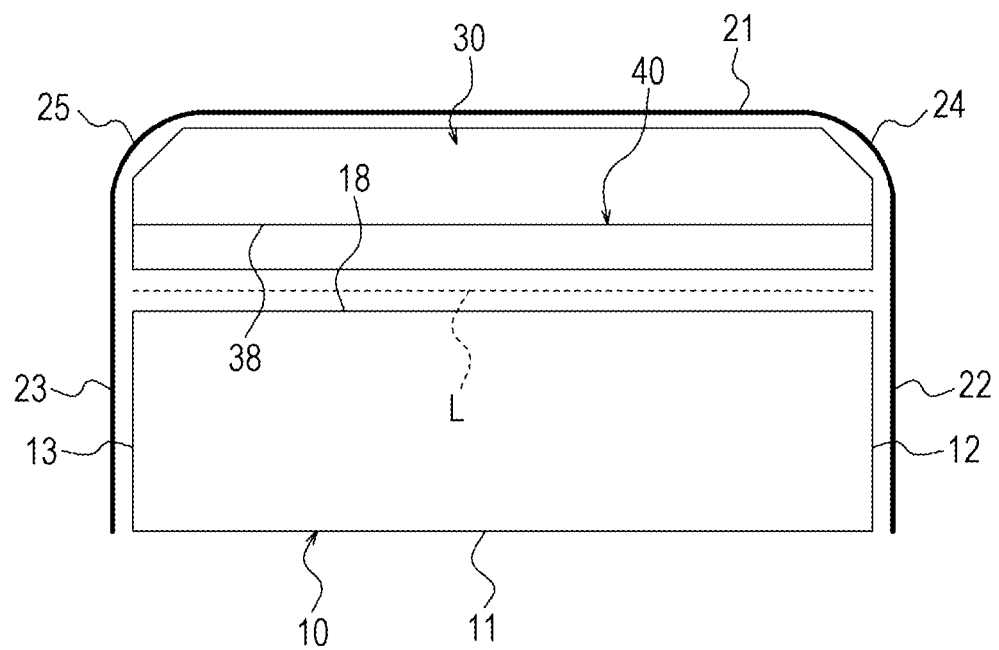
FIG. 10B schematically shows a cross section of the electric apparatus device of the present embodiment.

FIG. 10A schematically shows a cross section of an electric apparatus device of a comparative example. FIG. 10B schematically shows a cross section of the electric apparatus device of the present embodiment.

As described above, by constituting the cover body 20 to include the first curved cover portion 24 and the second curved cover portion 25, the electric apparatus device 1 or the case 2 for an electric apparatus can have higher designability (design properties).

However, when, as in the electric apparatus device of the comparative example shown in FIG. 10A, a cover body 120 includes a first curved cover portion 124 and a second curved cover portion 125 but is not provided with a waterproof frame, a waterproof line L between a case seal surface 118 and a cover seal surface 138 provided by a seal member 140 needs to be provided at a portion of a flat cover portion 121 on an inner side of the first curved cover portion 124 and the second curved cover portion 125. Therefore, the cover body 120 becomes larger than the case body 10 in a width direction by an amount corresponding to the radius of the first curved cover portion 124 and the second curved cover portion 125. In particular, when the cover body 120 includes a first side cover portion 122 and a second side cover portion 123, a problem that the electric apparatus device becomes large due to the first side cover portion 122 being disposed away from a second wall 112 and the second side cover portion 123 being disposed away from a third wall 113 and wasted space being formed between the first side cover portion 122 and the second wall 112 and wasted space being formed between the second side cover portion 123 and the third wall 113.

In contrast, as shown in FIG. 10B, in the electric apparatus device 1 of the present embodiment, the first curved cover portion 24 and the second curved cover portion 25 are formed in a recessed state at the cover body 20 including the first curved cover portion 24 and the second curved cover portion 25, the waterproof frame 30 that is disposed on an inner side of the flat cover portion 21 and the pair of curved cover portions 24 and 25 is disposed, and the cover seal surface 38 is disposed at the waterproof frame 30. Therefore, a waterproof line between the case seal surface 18 and the cover seal surface 38 provided by the seal member 40 can be provided not only at a portion of the flat cover portion 21, but also in a range extending toward the first curved cover portion 24 and the second curved cover portion 25 from the flat cover portion 21.

Therefore, even if the cover body 20 includes the first curved cover portion 24 and the second curved cover portion 25, it is possible to ensure a waterproof structure while suppressing the cover body 20 from increasing in size and the electric apparatus device 1 or the case 2 for an electric apparatus from increasing in size.

In particular, in the present embodiment, since the cover seal surface 38 is disposed further away than the first curved cover portion 24 and the second curved cover portion 25 from the flat cover portion 21, the waterproof line L between the case seal surface 18 and the cover seal surface 38 provided by the seal member 40 can be provided not only at a portion of the flat cover portion 21, but also in an entire range in a width direction on an inner side of the cover body 20 including the first curved cover portion 24 and the second curved cover portion 25. Therefore, even if the cover body 20 includes the first curved cover portion 24 and the second curved cover portion 25, the cover body 20 is formed with a size in correspondence with the size of the case body 10, and a waterproof structure can be ensured while minimizing the size of the electric apparatus device 1 or the case 2 for an electric apparatus.

Even if the cover body 20 includes the first side cover portion 22 and the second side cover portion 23, it is possible to ensure a waterproof structure while eliminating a gap between the first side cover portion 22 and the second wall 12 and a gap between the second side cover portion 23 and the third wall 13 and minimizing the size of the electric apparatus device 1 or the case 2 for an electric apparatus.

In this case, it is possible to provide a structure in which a boss is disposed on an outer surface of the second wall 12 and on an outer surface of the third wall 13 by a predetermined projection amount and thus the gap between the first side cover portion 22 and the second wall 12 and the gap between the second side cover portion 23 and the third wall 13 are adjusted to be uniform. The bosses can be disposed, for example, around the threaded holes 50 in the outer surface of the second wall 12 and the threaded holes 50 in the outer surface of the third wall 13.

Note that since the internal space of the waterproof frame 30 that is disposed at the cover body 20 communicates with the accommodation space 10a of the case body 10 and, together with the accommodation space 10a, constitutes the internal space of the case 2 for an electric apparatus, it is possible to reduce the size of the case body 10 by an amount corresponding to the size of the waterproof frame 30. Therefore, even if the waterproof frame 30 is disposed at the cover body 20, it is possible to suppress the size of the electric apparatus device 1 or the case 2 for an electric apparatus from increasing.

As shown in FIGS. 3 and 8, the case body 10 can include a gutter member 70.

The gutter member 70 is formed as a rail-like member having a substantially U shape (C shape) in cross section in which an open portion faces the protruding wall 16, and is integrated and continuous with an edge of the third case seal surface 18c facing the opening 10b. The gutter member 70 extends in a direction parallel to the fourth wall 14 in the entire range between the second wall 12 and the third wall 13, protrudes toward an outer side of the case body 10 from the opening 10b, and is disposed below the third case seal surface 18c of the case seal surface 18 extending along the third side 21c of the flat cover portion 21.

The gutter member 70 having the structure above can receive a liquid, such as water, and can discharge the received liquid to the outside from two end portions thereof.

Note that the gutter member 70 can be constituted as a member formed separately from the third case seal surface 18c and fixed to the case body 10.

When the electric apparatus device 1 is installed outdoors in an orientation in which the fourth wall 14 faces upward to be the top wall, water, such as rainwater, may accumulate on the body portion 43a of the third seal portion 43 of the seal member 40 disposed between the third case seal surface 18c of the case seal surface 18 and the third cover seal surface 38c of the cover seal surface 38.

In this case, the water flows toward the flat cover portion 21 along the third partition wall portion 34 that is tilted to be lower toward the flat cover portion 21, flows from there toward a lower end of the cover body 20 through the first communication portion 60 and the second communication portion 61 that are disposed as drainage channels on respective side portions of the third partition wall portion 34, and is discharged to the outside from a gap between the first curved cover portion 24 and a curved surface of the protruding wall 16 and a gap between the second curved cover portion 25 and a curved surface of the protruding wall 16.

However, the water that has accumulated on the body portion 43a of the third seal portion 43 disposed between the third case seal surface 18c and the third cover seal surface 38c may remain on the body portion 43a of the third seal portion 43 without being discharged. In this case, when for, for example, maintenance of the electric apparatus 3, the cover body 20 is removed from the case body 10 while the water remains on the body portion 43a of the third seal portion 43, the water may enter the accommodation space 10a of the case body 10 and adhere to the electric apparatus 3.

In contrast, in the electric apparatus device 1 of the present embodiment, since the case body 10 is provided with the gutter member 70 that is disposed below the third case seal surface 18c, even if the cover body 20 is removed from the case body 10 while water accumulated on the body portion 43a of the third seal portion 43 remains on the body portion 43a of the third seal portion 43 without being discharged, the water can be received by the gutter member 70 and discharged to the outside of the case body 10 from the two ends of the gutter member 70. Therefore, it is possible to prevent the water from unexpectedly entering the accommodation space 10a of the case body 10 and adhering to the electric apparatus 3.

The present disclosure is not limited to the embodiment above, and can be variously changed within a scope that does not depart from the spirit thereof.

For example, in the present embodiment, although the cover body 20 includes the first curved cover portion 24 and the second curved cover portion 25, the cover body 20 may include only one curved cover portion. In this case, the waterproof frame 30 may include only one of the partition wall portions corresponding to the one curved cover portion.

In the present embodiment, although the cover body 20 includes the first side cover portion 22 and the second side cover portion 23, the cover body 20 may not include the first side cover portion 22 and the second side cover portion 23.

Further, in the present embodiment, although, in a direction perpendicular to the flat cover portion 21, the cover seal surface 38 is disposed further away than the first curved cover portion 24 and the second curved cover portion 25 from the flat cover portion 21, the cover seal surface 38 may be disposed at a position within a range of the first curved cover portion 24 and the second curved cover portion 25.

Further, in the present embodiment, although the case body 10 is provided with the gutter member 70, the case body 10 may not be provided with the gutter member 70.

Further, in the present embodiment, although the electric apparatus device 1 is installed in an orientation in which the fourth wall 14 faces upward and the extension direction of the first wall 11 is parallel in a perpendicular direction, the electric apparatus device 1 is not limited thereto and the orientation of the electric apparatus device 1 when the electric apparatus device 1 is installed can be variously changed.

The invention claimed is:

1. A case for accommodating an electric apparatus, the case comprising:
   a case body including:
      an opening, and
      a ring-shaped case seal surface that is constituted in a same plane as the opening and that surrounds the opening;
   a cover body including:
      a rectangular flat cover portion, and
      a curved cover portion that is continuous with one side of the flat cover portion, the cover body mounted on the case body and covering the opening;
   a waterproof frame including a ring-shaped cover seal surface that is constituted in the same plane and that faces the case seal surface, the waterproof frame being disposed at the cover body and on an inner side of the flat cover portion and the curved cover portion; and
   a seal member disposed between the case seal surface and the cover seal surface, the seal member sealing a location between the case seal surface and the cover seal surface,
   wherein
   the waterproof frame has a box shape including a partition wall portion,
   the partition wall portion extends parallel to the one side of the flat cover portion, and extends toward the curved cover portion in a tilted manner with respect to a direction perpendicular to the flat cover portion from the flat cover portion toward the case seal surface,
   the case further comprises a communication portion formed between the curved cover portion and the partition wall portion,
   the case body is configured to accommodate the electric apparatus therein, and
   the waterproof frame is configured to not accommodate the electric apparatus therein.

2. The case according to claim 1,
   wherein the case body has a box shape including:
      a first wall;
      a second wall that is continuous with a first side of the first wall;
      a third wall that faces the second wall and is continuous with a second side of the first wall;
      a fourth wall that is continuous with a third side of the first wall and with the second wall and the third wall; and
      a fifth wall that faces the fourth wall and is continuous with a fourth side of the first wall and with the second wall and the third wall, and
   wherein the cover body has a U shape in cross section including:
      the flat cover portion;
      a first side cover portion that covers the second wall;
      a second side cover portion that covers the third wall;
      a first curved cover portion of the curved cover portion that is continuous with the flat cover portion and the first side cover portion; and
      a second curved cover portion of the curved cover portion that is continuous with the flat cover portion and the second side cover portion.

3. The case according to claim 1,
   wherein the cover seal surface is disposed further away than the curved cover portion from the flat cover portion.

4. The case according to claim 1,
   wherein the case body includes a gutter member, the gutter member extending toward an outer side of the case body from the opening and being disposed below a portion of the cover seal surface extending along another side of the flat cover portion that is orthogonal to the one side.

5. The case according to claim 1,
   wherein the communication portion is a drainage channel extending in an up-down direction.

6. The case according to claim 1, wherein
   the cover body further includes a side cover portion extending in the direction perpendicular to the flat cover portion, and
   the partition wall portion extends in the tilted manner from the flat cover portion to the side cover portion.

7. The case according to claim 6, wherein
   the communication portion is a space between the curved cover portion and the partition wall portion and is elongated along another side of the flat cover portion that is orthogonal to the one side of the flat cover portion.

8. An electric apparatus device, comprising:
   a case; and
   an electric apparatus in the case,
   wherein the case includes:
      a case body including:
         an opening, and
         a ring-shaped case seal surface that is constituted in a same plane as the opening and that surrounds the opening;
      a cover body including:
         a rectangular flat cover portion, and
         a curved cover portion that is continuous with one side of the flat cover portion, the cover body mounted on the case body and covering the opening;
      a waterproof frame including a ring-shaped cover seal surface that is constituted in the same plane and that faces the case seal surface, the waterproof frame being disposed at the cover body and on an inner side of the flat cover portion and the curved cover portion; and
      a seal member disposed between the case seal surface and the cover seal surface, the seal member sealing a location between the case seal surface and the cover seal surface,
      wherein
      the waterproof frame has a box shape including a partition wall portion, the partition wall portion extends parallel to the one side of the flat cover portion, and extends toward the curved cover portion in a tilted manner with respect to a direction perpendicular to the flat cover portion from the flat cover portion toward the case seal surface, the case further comprises a communication portion formed between the curved cover portion and the partition wall portion, the electric apparatus is disposed inside the case body, and the electric apparatus is not disposed inside the waterproof frame.

\* \* \* \* \*